(12) United States Patent  (10) Patent No.: US 7,978,067 B2
Wagner et al.  (45) Date of Patent: Jul. 12, 2011

(54) INTELLIGENT CONTAINER

(75) Inventors: Ron Wagner, Fort Worth, TX (US);
John Redmond, Fayetteville, GA (US);
Scott Higgins, Ozark, MO (US); Jason Amschler, Springfield, MO (US)

(73) Assignee: Custom Metalcraft, Inc., Springfield, MO (US)

( * ) Notice: Subject to any disclaimer, the term of this patent is extended or adjusted under 35 U.S.C. 154(b) by 1169 days.

(21) Appl. No.: 11/425,863

(22) Filed: Jun. 22, 2006

(65) Prior Publication Data

US 2006/0290491 A1  Dec. 28, 2006

Related U.S. Application Data

(60) Provisional application No. 60/692,777, filed on Jun. 22, 2005.

(51) Int. Cl.
*G08B 1/08* (2006.01)
*G08B 13/00* (2006.01)

(52) U.S. Cl. ........... 340/539.26; 340/539.1; 340/539.13; 340/539.22; 340/541; 340/286.02

(58) Field of Classification Search ............... None
See application file for complete search history.

(56) References Cited

U.S. PATENT DOCUMENTS

| | | | |
|---|---|---|---|
| 5,565,858 A * | 10/1996 | Guthrie | 340/10.33 |
| 6,362,736 B1 * | 3/2002 | Gehlot | 340/568.1 |
| 6,661,339 B2 | 12/2003 | Muirhead | |
| 6,943,678 B2 | 9/2005 | Muirhead | |
| 6,972,682 B2 | 12/2005 | Lareau et al. | |
| 7,002,472 B2 * | 2/2006 | Stratmoen et al. | 340/539.26 |
| 7,098,784 B2 * | 8/2006 | Easley et al. | 340/539.13 |
| 7,342,496 B2 | 3/2008 | Muirhead | |
| 2002/0027504 A1 * | 3/2002 | Davis et al. | 340/540 |
| 2004/0168618 A1 | 9/2004 | Muirhead | |
| 2004/0174260 A1 | 9/2004 | Wagner | |
| 2006/0208881 A1 * | 9/2006 | Suzuki | 340/539.27 |
| 2006/0255934 A1 * | 11/2006 | Easley et al. | 340/539.13 |
| 2006/0291657 A1 * | 12/2006 | Benson et al. | 380/270 |
| 2007/0137531 A1 | 6/2007 | Muirhead | |
| 2007/0171080 A1 | 7/2007 | Muirhead | |
| 2008/0117040 A1 * | 5/2008 | Peel et al. | 340/539.16 |

OTHER PUBLICATIONS

Scott A.W. Muirhead, Letter to Applicant's Counsel dated Oct. 28, 2009.

\* cited by examiner

*Primary Examiner* — Julie Lieu
(74) *Attorney, Agent, or Firm* — Hovey Williams LLP

(57) ABSTRACT

A system for remotely identifying, tracking, and monitoring transported goods includes a sensing and communications device (14) embedded in a shipping container (2). The sensing and communications device (14) includes onboard sensors (58,60,62) and wirelessly communicates with external sensors (24,26) to receive environmental and structural condition data. The device (14) communicates the data via either an RF interface (52,54) or a cellular telephone system interface (48,50) to a remote monitoring station (68). The remote monitoring station (68) analyzes the data, presents the data to a user, and enables the user to program the device (14).

37 Claims, 15 Drawing Sheets

| CONTAINER ID ▽ SORT | TIME ▽ SORT | TEMP (°C) ▽ SORT | PRESSURE (lB/IN²) ▽ SORT | HUMIDITY (%RH) ▽ SORT | SHOCK EXCEEDENCE ▽ SORT | SERIAL# | TMS | UIC | GPS |
|---|---|---|---|---|---|---|---|---|---|
| 003 | 12/4/2001 16:10:32 | 22 | 37 | 50 | SHOCK WARNING | | | | |
| 003 | 12/4/2001 16:9:23 | 23 | 14 | 18 | SHOCK WARNING | | | | |
| 003 | 12/4/2001 16:3:8 | 23 | 14 | 19 | SHOCK WARNING | | | | |
| 003 | 12/4/2001 15:56:54 | 23 | 14 | 18 | SHOCK WARNING | | | | |
| 003 | 12/4/2001 15:50:40 | 23 | 14 | 19 | SHOCK WARNING | | | | |
| 003 | 12/4/2001 15:44:25 | 23 | 14 | 19 | SHOCK WARNING | | | | |
| 003 | 12/4/2001 15:38:10 | 23 | 14 | 18 | SHOCK WARNING | | | | |
| 003 | 12/4/2001 15:31:55 | 23 | 14 | 19 | SHOCK WARNING | | | | |
| 003 | 12/4/2001 15:31:55 | | | | | | | | |

FIG. 15

INTELLIGENT CONTAINER

RELATED APPLICATIONS

The present application is a nonprovisional patent application and claims priority benefit, with regard to all common subject matter, of earlier-filed U.S. provisional patent application titled "INTELLIGENT CONTAINER", Ser. No. 60/692,777, filed Jun. 22, 2005. The identified earlier-filed provisional application is hereby incorporated by reference into the present application.

BACKGROUND OF THE INVENTION

1. Field of the Invention

The present invention relates to the field of systems for remotely identifying, tracking, and monitoring transported goods. More particularly, the present invention involves a system that includes an electronic device embedded in a transported item that monitors location, environmental conditions, and structural conditions of the item and communicates the location and conditions to a remote monitoring station via a wireless communications medium for automated analysis and presentation to a user.

2. Description of Prior Art

It is often desirable to track items that are shipped in order to monitor a location of the items. It is known in the art to monitor and track assets using wireless communications. U.S. Pat. No. 6,972,682, for example, teaches a network of identification tags operable to communicate with each other and with a remote monitoring station.

Unfortunately, existing tracking systems suffer from various problems and limitations. Existing systems, for example, are limited in range because they only communicate with other tags and remote monitoring stations that are within range of an on-board RF transceiver. Furthermore, while existing systems communicate information about the shipped items to remote monitoring stations for review by a user, such communications are limited, one-way communications.

Accordingly, there is a need for an improved system of remotely identifying, tracking, and monitoring items during shipping that does not suffer from the problems and limitations of the prior art.

SUMMARY OF THE INVENTION

The present invention provides an improved system for remotely identifying, tracking, and monitoring transported goods. Particularly, the present invention provides an identification and communication device embedded in a shipping container that is operable to communicate identification, location, and condition data to a remote monitoring station via one of two wireless communication protocols, and is operable to receive operating instructions from the remote monitoring station via the wireless communication protocols.

A first embodiment of the invention is a system for monitoring conditions of a container. The system comprises a first sensor for sensing a first condition and generating first condition data, an identification component for storing identification data, a first wireless interface for communicating according to a first wireless protocol, and a second wireless interface for communicating according to a second wireless protocol. A controller selects the first wireless protocol or the second wireless protocol as a preferred protocol, and communicates the first condition data and the identification data via the preferred wireless protocol.

A second embodiment of the invention is a method of remotely monitoring conditions of a container and presenting the conditions to a user. The method comprises sensing a first condition associated with the container and generating first condition data, associating identification data with the container, selecting a preferred communications protocol from a first wireless protocol and a second wireless protocol, and communicating the first condition data and the identification data to a remote monitoring station via the preferred wireless protocol.

According to a third embodiment of the invention, the system comprises a first sensor for sensing a first condition and generating first condition data, a second sensor for sensing a second condition and generating second condition data, a global positioning system receiver for generating location data, an identification component for storing identification data, a first wireless interface for communicating with an interface associated with another container and for communicating directly with a remote monitoring station, and a second wireless interface for communicating via a general packet radio service protocol.

A controller determines a preferred interface for communicating with the remote monitoring station, wherein the first interface is preferred if communications with the remote monitoring station are available via the first interface, and wherein the second interface is preferred if communications with the remote monitoring station are not available via the first interface. The controller further communicates the first condition data, the second condition data, the identification data, and the location data to the remote monitoring station via the preferred wireless medium.

A fourth embodiment of the invention is a computer program for enabling a remote monitoring system, at least a portion of the program being stored on a computer-usable medium. The computer program comprises various code segments, including code segments for receiving data relating to a plurality of remote containers, wherein the data includes condition data, location data, and identification data; for comparing the location data of each container with a planned course schedule associated with the container's identification data, and generating a first alert if the location data indicates a deviation from the planned course schedule; for comparing the condition data of each container with a threshold level associated with the container's identification data, and generating a second alert if the condition data indicates a condition has exceeded a threshold level; and for communicating the first alert and the second alert to a user via a user-selected communication means.

These and other important aspects of the present invention are described more fully in the detailed description below.

BRIEF DESCRIPTION OF THE DRAWINGS

An embodiment of the present invention is described in detail below with reference to the attached drawing figures, wherein:

FIG. 15 is an exemplary user interface generated by the computer program of FIG. 14, wherein the user interface presents various pieces of data received from the sensing and communications device and highlights exceptional data values.

DETAILED DESCRIPTION

Figure 1:
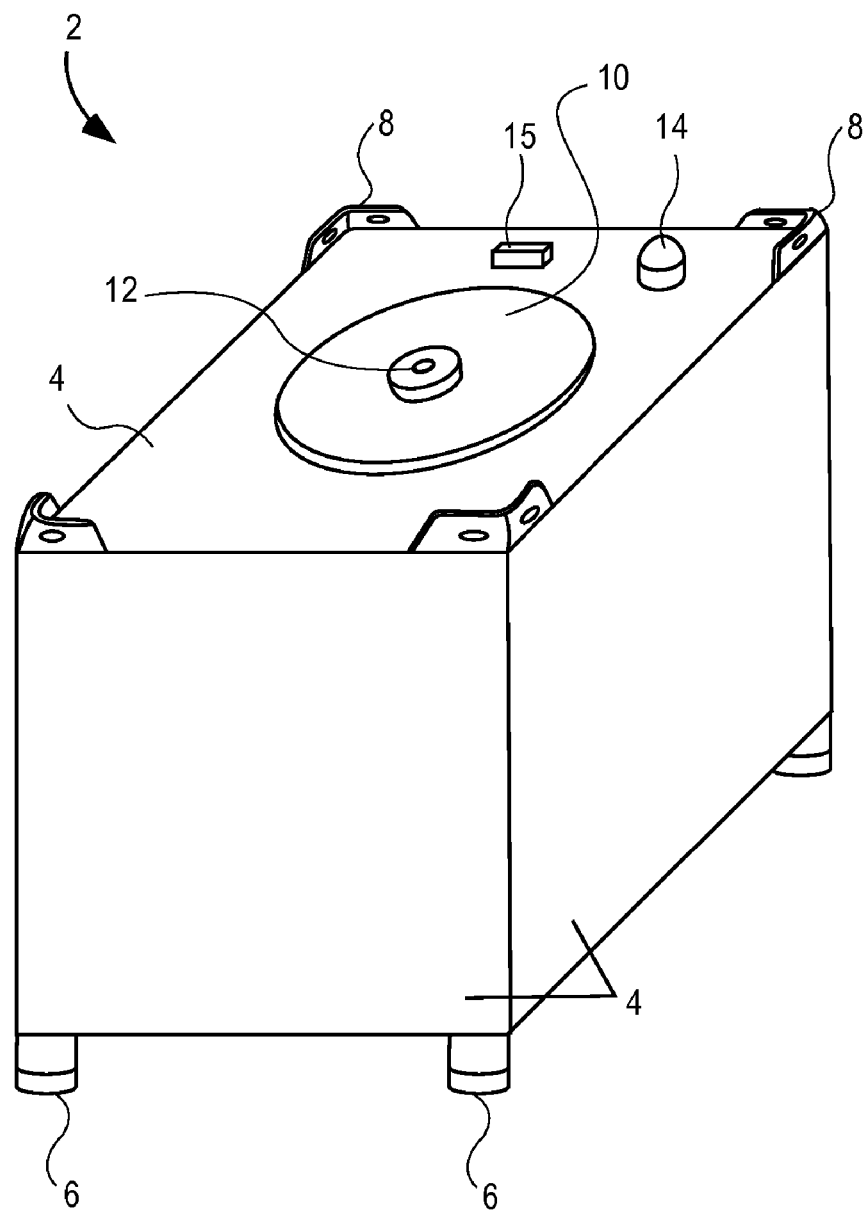
FIG. 1 is a perspective view of an exemplary container including a sensing and communication device for enabling the system of the present invention to remotely identify, track, and monitor the container.

A storage container constructed according to principles of the present invention is illustrated in FIG. 1 and designated generally by the reference numeral 2. The container 2 comprises a plurality of side walls 4, a plurality of legs 6 depending from a bottom of the container 2, a plurality of upstanding L-shaped brackets 8 located generally at the corners of a top of the container 2, a removable cover 10 for sealing a top fill opening, a bung hole 12 in the cover 10, a sensing and communication device 14 integrally formed in a wall 4 of the container 2, and a communications modem 15 attached to a wall of the container 2.

The plurality of side walls 4 form a container housing and define an internal containment area of the container 2. The legs 6 support the container 2 and space a bottom wall of the container 2 from a surface or structure upon which the container 2 rests. The brackets 8 serve as lift lugs and facilitate stacking a plurality of similar containers. Each of the legs 6 of a first container, for example, nest within a bracket 8 of a second container when the first container is stacked on the second container.

Figure 2:
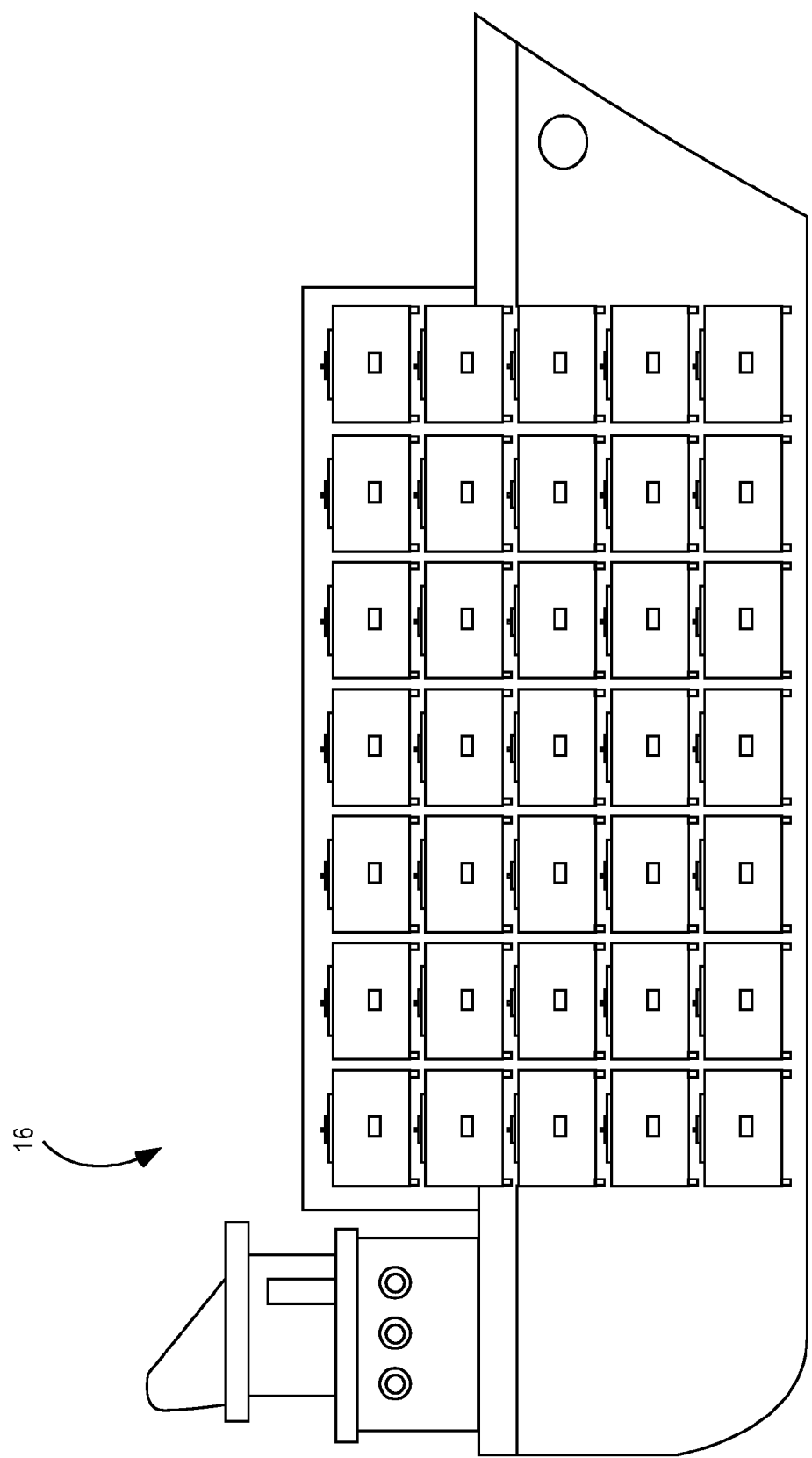
FIG. 2 is a first exemplary shipping environment of the container of FIG. 1, wherein the container is illustrated as one of a plurality of containers on a ship.
Figure 3:
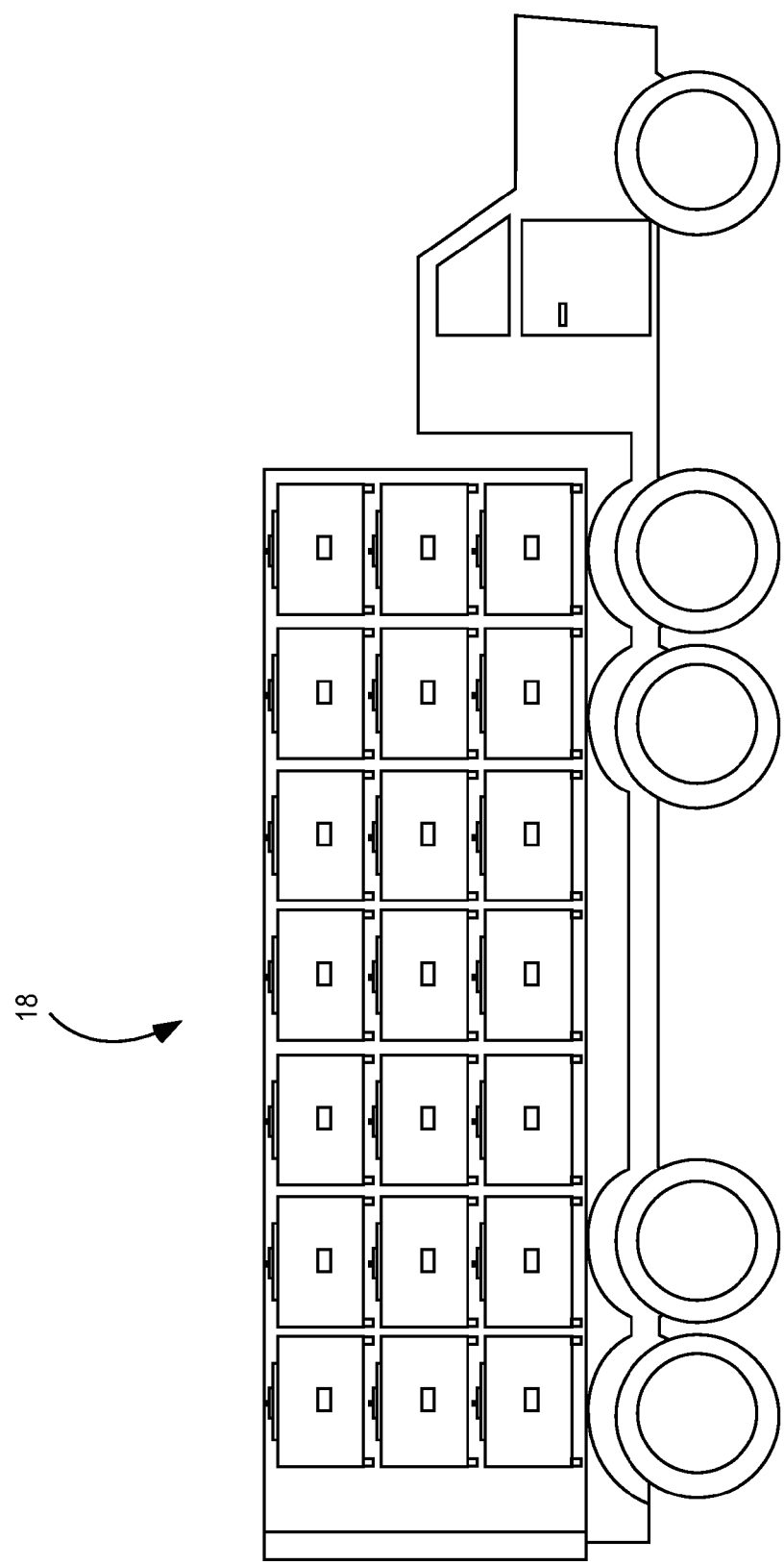
FIG. 3 is a second exemplary shipping environment of the container of FIG. 1, wherein the container is illustrated as one of a plurality of containers on a truck.

The illustrated container 2 is an intermediate bulk container, such as a TRANSTORE™ liquid handling tank manufactured by Custom Metalcraft, Inc., of Springfield, Mo. The container 2 may be of various sizes and shapes, and may have a capacity, for example, of from fifty gallons to seven hundred gallons, depending on the application. Intermediate bulk containers are constructed to withstand the mechanical shock associated with a shipping environment. The container 2 may be used in a substantially stationary application, such as a petroleum processing plant, or a mobile application, such as shipping. FIGS. 2 and 3 illustrate conventional shipping environments of the container 2, wherein FIG. 2 illustrates a plurality of containers stacked on a ship 16, and FIG. 3 illustrates a plurality of containers stacked in a tractor-trailer 18. When stacked in a ship or in a truck, communications via one or more of the interfaces (described below) may be inhibited by distance or interference by metal surfaces of the shipping vehicle.

The container 2 may also be used as a stationary storage tank. The container 2, for example, may be adapted to store petroleum-based fluids, such as oil or natural gas, as the fluids are produced, processed, or dispensed. Furthermore, the container 2 may be completely sealed, substantially enclosed, or substantially open. A stationary container may have an open top, for example. Those skilled in the art will recognize that the container 2 may be used to contain virtually any fluid and may be used in various applications.

The present invention is especially useful with liquid handling containers due to the potentially sensitive nature of transporting liquids. It will be appreciated, however, that the present invention may be implemented using substantially any type of container, including sealable containers for handling liquids and unsealed containers adapted to transport only non-liquid payloads. By way of example, the present invention may be implemented using a railroad tank car, a railroad box car, a truck-mounted or truck-pulled tank or cargo trailer, or a combination thereof.

Figure 4:
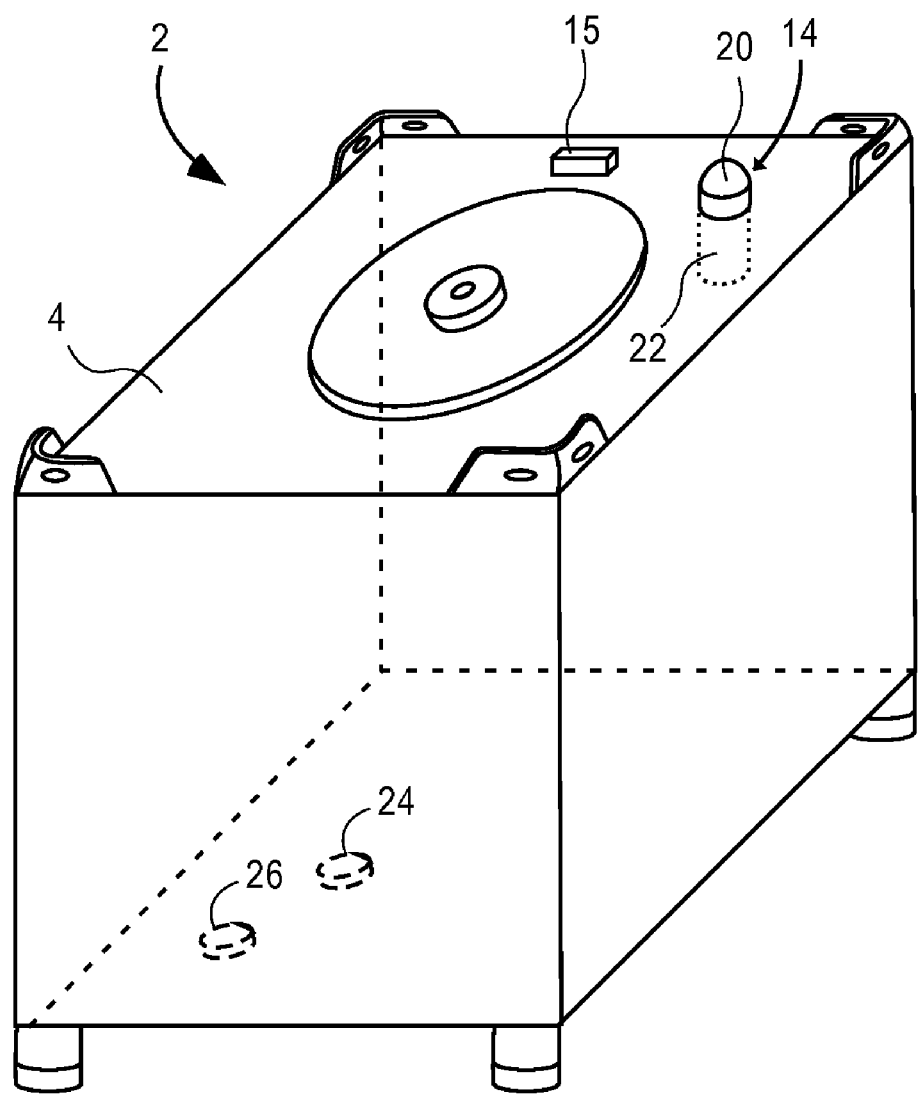
FIG. 4 is the container of FIG. 1, wherein various internal aspects of the container are illustrated in phantom.

FIG. 4 illustrates various internal features of the container 2. The device 14 includes an external portion 20 and an internal portion 22, and the container 2 includes a first sensor 24 and a second sensor 26. The sensors 24,26 are associated with the container 2 and are external to the device 14. The sensors 24,26 may be internal to the container 2 (as illustrated) or may be external, and may be attached to the container 2 or unattached.

The device 14 enables remote sensing, tracking, and monitoring of the container 2. More particularly, the device 14 is integral with or embedded within a wall 4 of the container 2 and monitors location, environmental conditions, and structural conditions of the container 2, and communicates location and condition data to a remote monitoring station via a wireless communications medium for automated analysis and presentation to a user.

Figure 5:
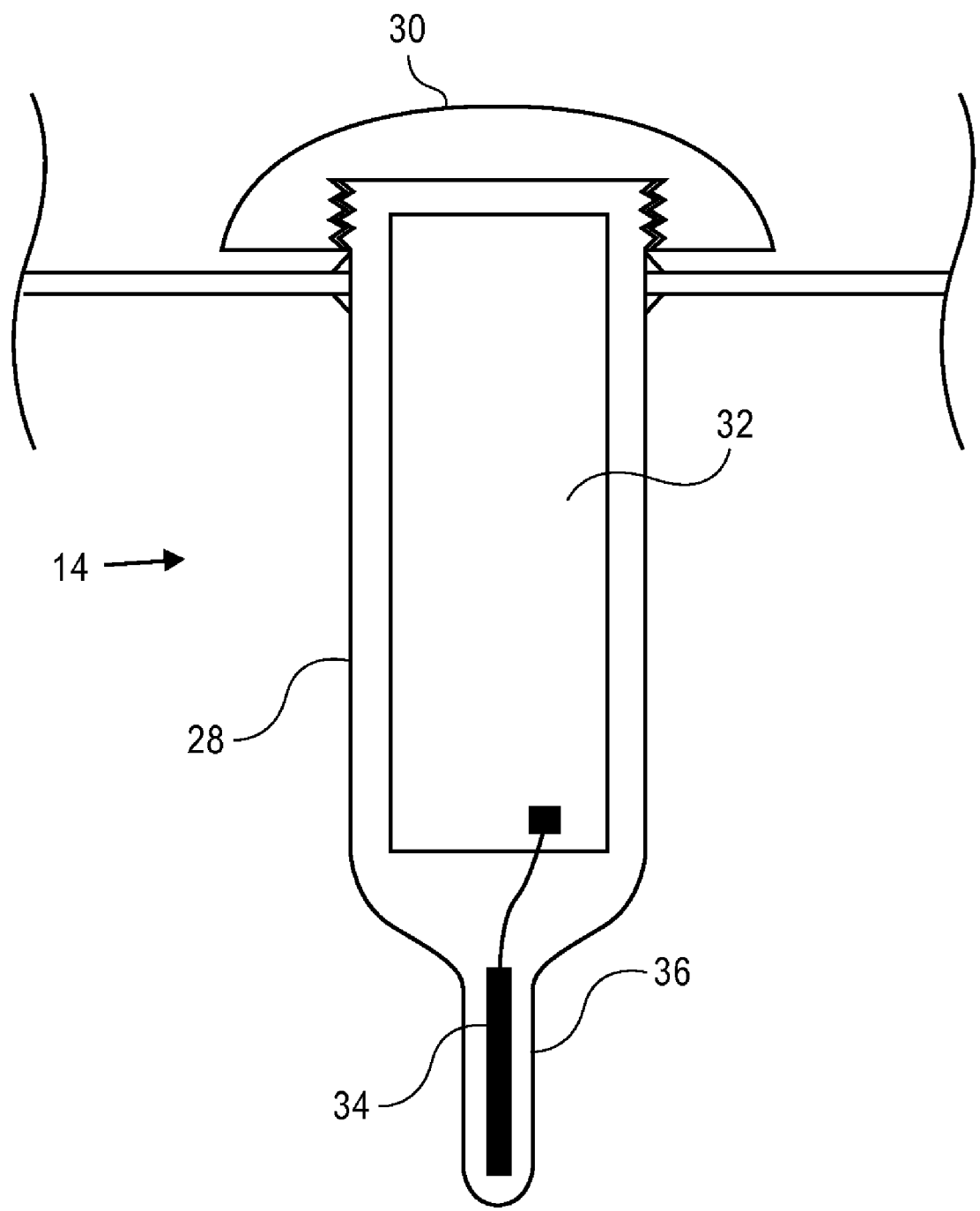
FIG. 5 is a cross-sectional view of the sensing and communication device of FIG. 1, wherein the device is housed in a cavity integrally formed in a wall of the container.

A cross-sectional view of the device 14 is illustrated in FIG. 5. The device 14 comprises a housing 28, a cap 30, circuit board 32, and a sensor element 34 external to the circuit board 32. A portion 36 of the housing 28 is adapted to accommodate the sensor element 34. For example, the portion 36 may be a thermowell for housing a temperature sensor. The housing 28 is tubular and provides an airtight cavity for containing the electronic components of the device 14. The housing 28 may have a diameter, for example, of from about one-half inch to about fifteen inches, more preferably from about one inch to about ten inches, and most preferably from about four inches to about six inches.

The housing 28 is constructed of a material that is sufficiently rigid and sturdy to withstand the riggers of an industrial shipping environment. The housing 28 is preferably constructed of metal, but may also be constructed plastic or a similar material. The housing 28 is preferably integral with the container 2, such as where the housing 28 is welded to the wall 4 or forged concurrently with the wall 4.

Figure 6:
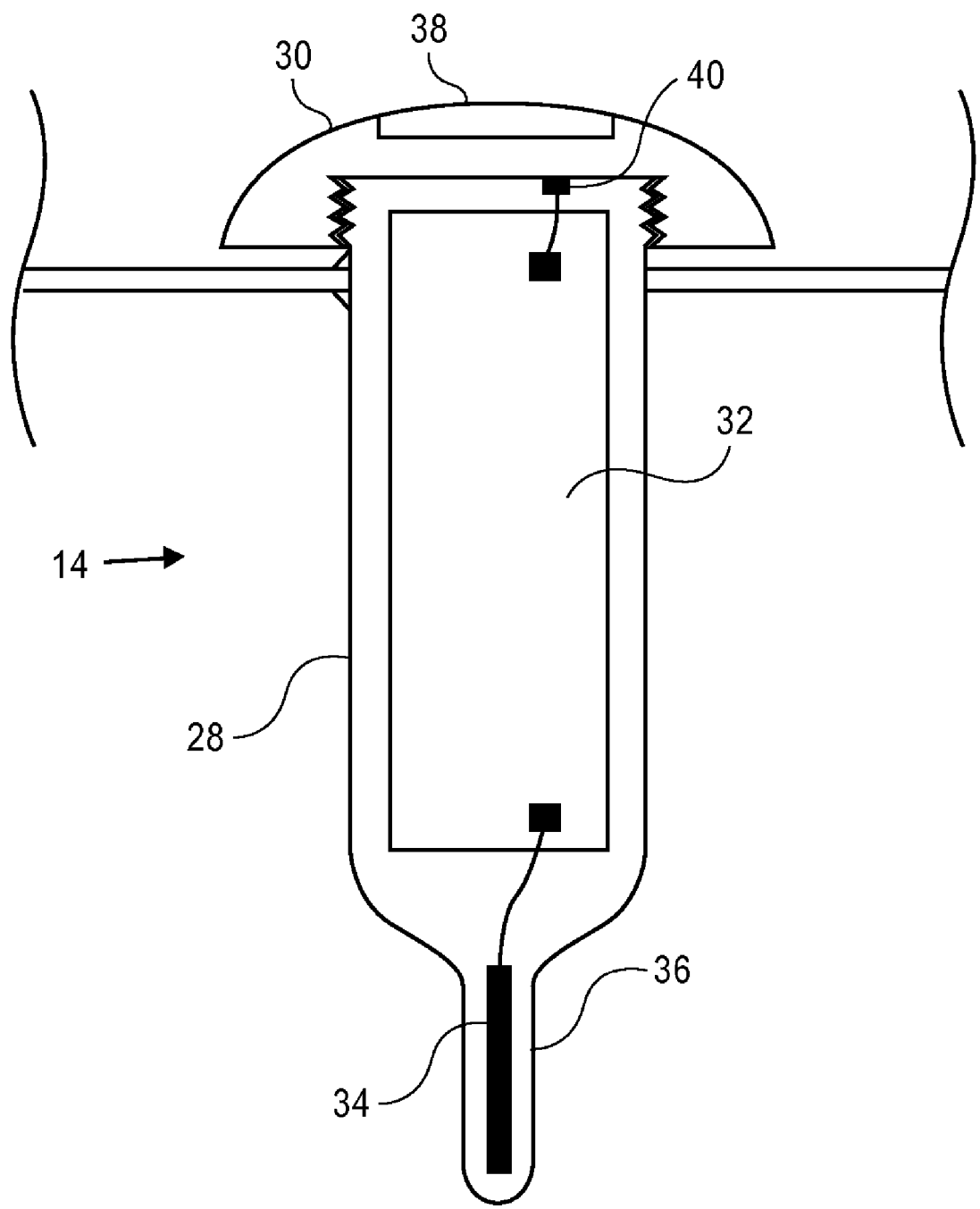
FIG. 6 is the sensing and communication device of FIG. 5, wherein the cavity is sealed with a metal cap that forms a slot antenna.

The cap 30 is removably attached to the housing 28 for allowing access to the inside of the device 12 when removed, and for protecting the components of the device 12 from the elements when attached. The illustrated cap 30 is threadedly attached to the housing 28, but may be removably secured in another manner. The cap 30 may be constructed of plastic to enable passage of wireless signals, as explained in greater detail below. Alternatively, and as illustrated in FIG. 6, the cap 30 may be constructed of metal and used as an antenna to transmit and receive the wireless signals. The cap 30 illustrated in FIG. 6 is a slot antenna and thus includes a slot 38. When the cap is driven as an antenna by a driving signal, the slot radiates electromagnetic waves. A removable connector 40 connects the cap 30 to the circuit board 32 to enable communication of signals between a circuit of the circuit board 32 and the cap 30.

Figure 7:
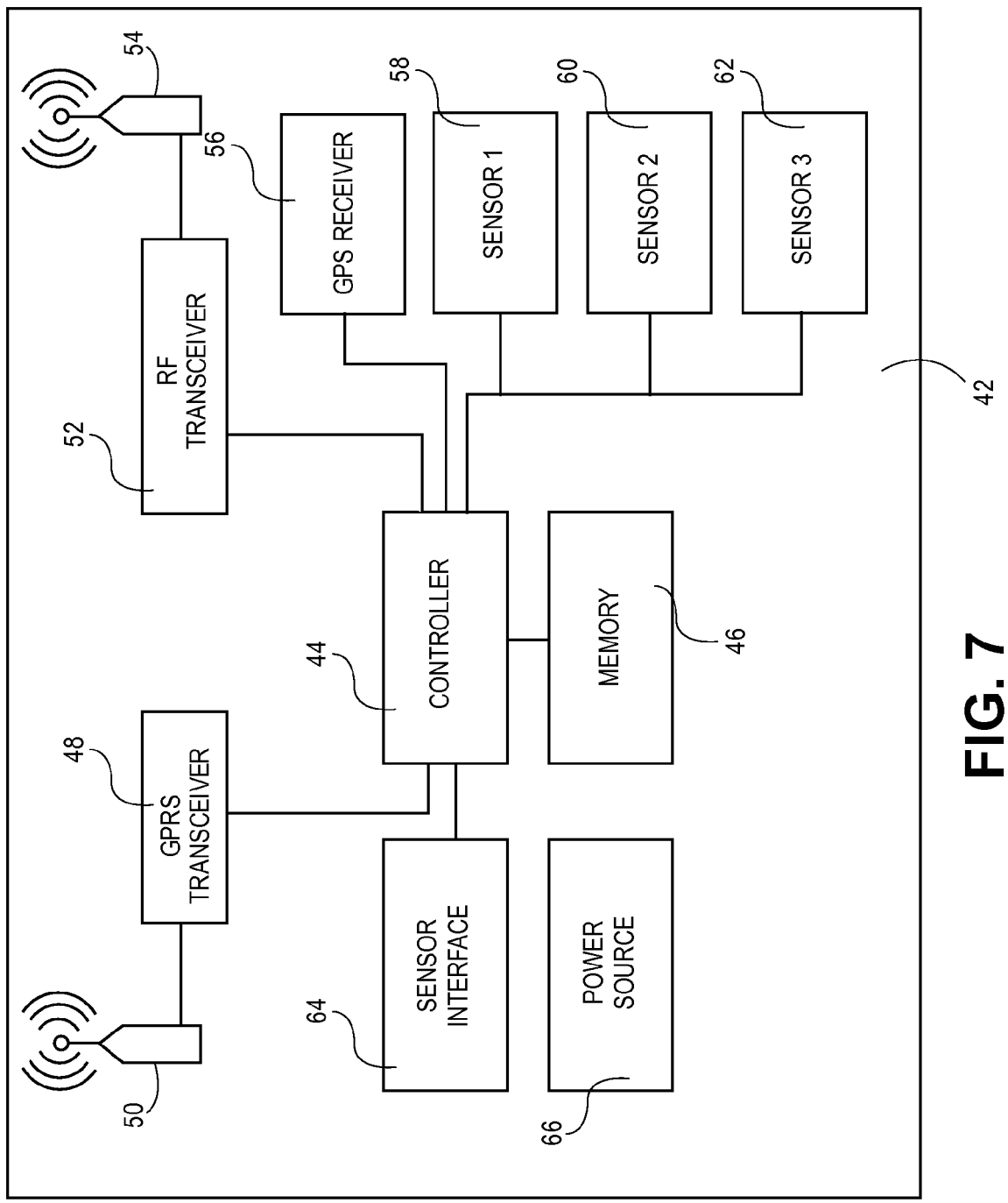
FIG. 7 is a block diagram of components included in an electric circuit of the device of FIG. 5.

A block diagram of an exemplary circuit of the circuit board 32 is illustrated in FIG. 7 and designated generally by the reference numeral 42. The circuit 42 comprises a controller 44; a memory element 46; a general packet radio service (GPRS) transceiver 48; a first antenna 50 associated with the GPRS transceiver 48; an RF transceiver 52; a second antenna 54 associated with the RF transceiver 52; a GPS receiver 56; a plurality of sensors 58,60,62; a sensor interface 64; and a power source 66. The RF transceiver 52 and antenna 54 together form a firs wireless interface, and the GPRS transceiver 48 and antenna 50 together form a second wireless interface.

The controller 44 generally controls operation of the circuit 42. The controller 44 is preferably a digital integrated circuit and may be a general use, commercial off-the-shelf computer processor. Alternatively, the controller 44 may be a programmable logic device configured for operation with the circuit 42, or may be an application specific integrated circuit (ASIC) especially manufactured for use in the circuit 42. While illustrated as a single component, the controller 44 may include two or more separate integrated circuits working in cooperation to control operation of the circuit 42. The memory element 46 stores data, instructions, or both used by the controller 44. While the memory element 46 is illustrated as separate from the controller 44, the memory 46 may be internal to the controller 44.

The GPRS interface 48 includes circuitry for transmitting and receiving data via the first antenna 50 in signals preferably within the range of from about 902 MHz to about 928 MHz. The GPRS interface 48 includes a chipset for conditioning signals according to the GPRS protocol. GPRS shares cellular phone channels and communicates data via a cellular telephone network. Thus, if a cellular phone tower is within range of the GPRS transceiver, the circuit 42 can transmit and receive data via the cellular network. It will be appreciated that the GPRS interface 48 communicates according to a cellular telephone system protocol, and that cellular protocols other than GPRS may be used including, for example, analog, digital, and third generation protocols. Furthermore, the interface 48 may communicate via a radio signal of virtually any frequency, so long as the frequency conforms to the protocol.

The RF interface 52 includes circuitry for transmitting and receiving data via the second antenna 54 in signals preferably at a frequency of 433.92 megahertz. The RF interface 52 includes a chipset for conditioning signals to communicate with other devices 14. The RF interface 52 has a range of about one-hundred yards, which may vary greatly depending on the environment. The RF interface communicates according to a radio frequency identification (RFID) protocol with one or more containers and/or a remote monitoring station, as explained below in greater detail. The RF interface 52 may communicate via a radio signal of substantially any frequency within the radio frequency spectrum, including the range of 125 kHz to 6 GHz. Certain frequencies within that range may be preferred, however, such as 433.92 MHz, frequencies within the range of 902 MHz to 928 MHz, and 2.4 GHz. These are but a few examples.

It will be appreciated that both the GPRS interface 48 and the RF interface 52 are associated with a single controller 44 and memory element 46, eliminating the need to have a dedicated controller and memory element for each interface.

The GPS receiver 56 includes conventional circuitry for receiving signals from a plurality of orbiting GPS satellites and determining a location based on the signals.

The GPRS interface 48, the RF interface 52, or both, may communicate with the communications modem 15 (FIG. 1) via a wireless or wired link. The modem 15 enables the device 14 to communicate with an external communications system, such as satellite or high frequency, that neither the GPRS interface 48 nor the RF interface 52 can communicate with directly.

The sensors 58,60,62 are part of the circuit 42, and may or may not be fixed on the circuit board 32. The sensors 58,60,62 sense environmental and structural conditions of the container 2. Environmental conditions include temperature, pressure, humidity, mechanical shock, vibrations, solar exposure, electromagnetic radiation, nuclear radiation, fill level (level of container contents), and chemical balance of container contents. Structural conditions include stress and strain experienced by a portion of the container 2, and the position of the removable cover 10 (on/off).

The sensor interface 64 enables communication with sensors that are external to the circuit 42, such as sensors 24 and 26, and may be a wired or wireless interface. The sensors 24 and 26 sense conditions of the container 2, such as temperature, pressure, humidity, and so forth, as explained above. The sensor interface 64 may communicate with one or more external sensors via the Bluetooth or WiFi wireless communications protocols. Each of the sensors 24,26 may similarly include a wireless interface that is compatible with the sensor interface 64, thus enabling the sensors 24,26 to communicate data to the device 14 from any point within the container 2. The sensors 24,26 are adapted to reside within the container 2, even when the container 2 is filled with a liquid. Thus, the sensors 24,26 are sealed and are self-powered.

Figure 8:
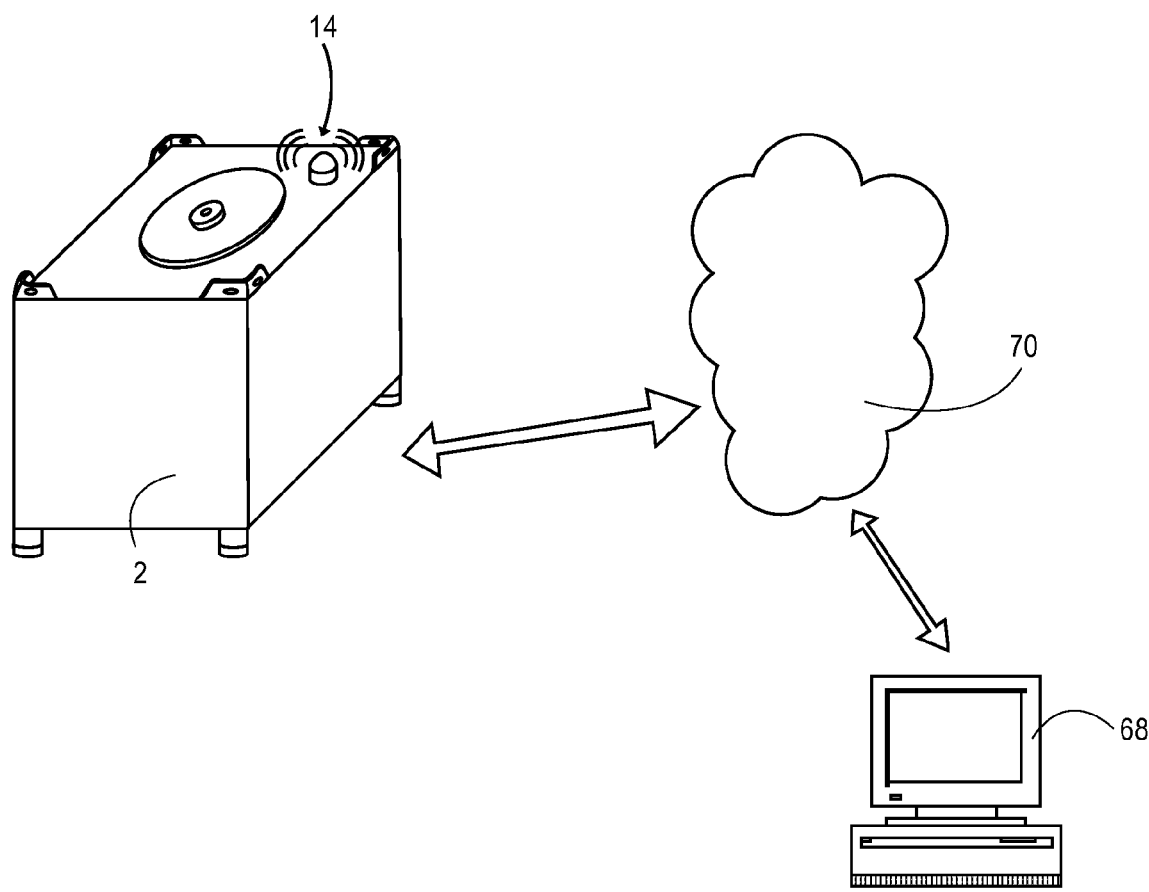
FIG. 8 is a block diagram of a first implementation of the system of the present invention, including the container of FIG. 1, a wireless communications medium, and a remote monitoring station.

An exemplary first implementation of the system of the present invention is illustrated in FIG. 8, wherein the system includes the container 2, a remote monitoring station 68, and a communications system 70 for enabling communications between the device 14 of the container 2 and the remote monitoring station 68. The remote monitoring station 68 receives condition data generated by the device 14 and communicated via the communications system 70. As explained below in greater detail, the remote monitoring station 68 analyzes the data and presents the data to a user via a user interface. The wireless communications system 70 may be a cellular phone communications network including a series of towers operable to communicate with the GPRS interface 48 of the device 12, or may be a satellite communications system operable to communication with a satellite modem associated with the circuit 42.

In this implementation, the remote monitoring station 68 may monitor temperature and pressure of contents of the container 2, for example, as the container is transported from a first geographic location to a second geographic location via truck, train, or boat. As long as the container 2 is within range of the communications system 70, the device 14 will be able to communicate the sensor data to the remote monitoring station 68. If the communications system 70 is a cellular phone network, the container 2 will be within range of the communications system 70 as long as it is within range of a cell tower of the network. If the communications system 70 is a satellite communications system, the container 2 will be within range of the communications system 70 at nearly any geographic location.

Figure 9:
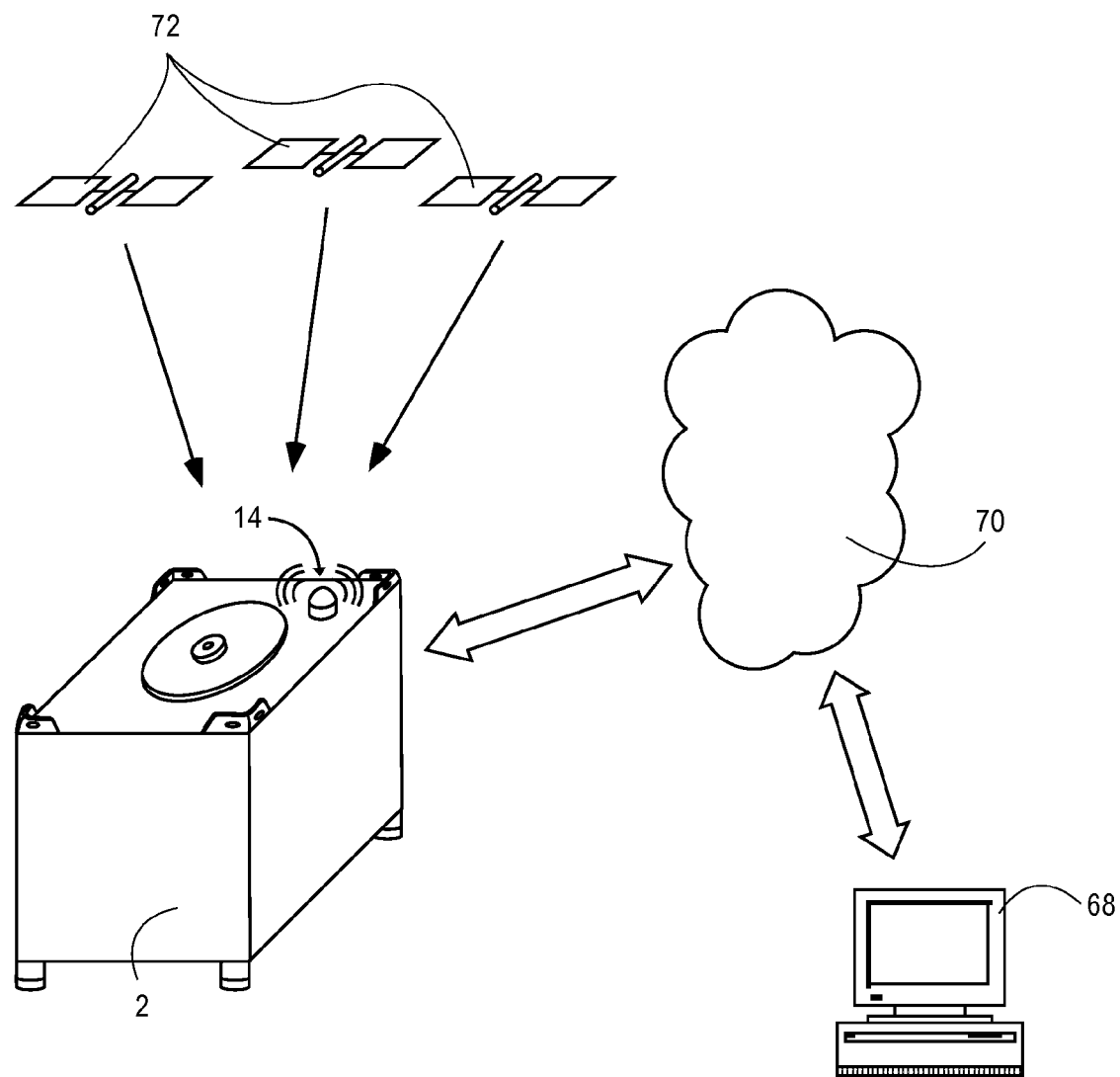
FIG. 9 is a block diagram of a second implementation of the system of the present invention, wherein the container uses data received from a plurality of GPS satellites to generate location data.

An exemplary second implementation of the system of the present invention is illustrated in FIG. 9. The second implementation is similar to the first implementation, except that in the second implementation the device 14 is operable to generate location data based on signals received from a plurality of GPS satellites 72 by way of the GPS receiver 56. In this implementation, the device 14 communicates not only condition data, but also location data, to the remote monitoring station 68 for processing and presentation to a user. If a plurality of containers are placed through a field or other geographic region, each container is operable to communicate its location to the remote monitoring station 68 either through direct communications with the station 68 or indirectly through one or more other containers.

Figure 10:
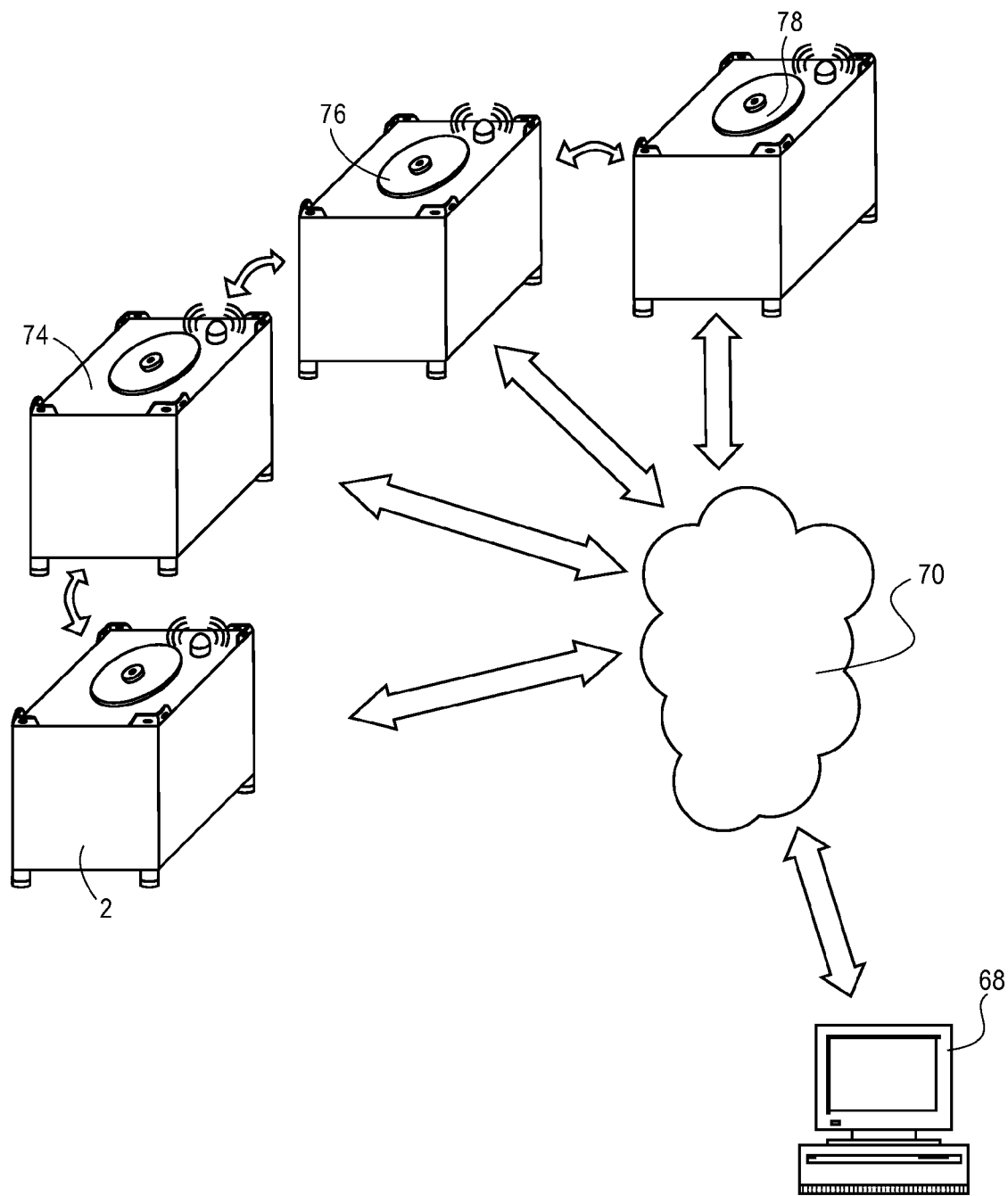
FIG. 10 is a block diagram of a third implementation of the system of the present invention, wherein the system includes a plurality of containers in communication with the remote monitoring station.

An exemplary third implementation of the system of the present invention is illustrated in FIG. 10, wherein the third implementation is similar to the implementation illustrated in FIG. 8, except that the third implementation includes a plurality of containers 2,74,76,78 that communicate directly with each other as well as with the remote monitoring station 68 via the communications system 70. When communicating with each other, the containers may follow a mesh protocol or an ordered protocol. When communicating via the mesh protocol, the containers communicate simultaneously and autonomously determine a path from containers that are not within range of the remote monitoring station 68 to containers that are within range.

When communicating via the ordered protocol, the remote monitoring station 68 establishes a network of nodes wherein each container is associated with a node. The remote monitoring station 68 may establish this network, for example, by polling the containers in a breadth-first search to identify each container in the network. If the remote monitoring station 68 is able to communicate with containers 2 and 74, for example, the station 68 would request container 74 to maintain radio silence and container 2 to determine what devices it can communicate with. The device 2 then polls other devices and discovers that it can communicate with device 76 (container 74 is maintaining radio silence). The remote monitoring station 68 then requests container 2 to maintain radio silence and container 74 to determine what devices it can communicate with. The container 74 may then discover the container 78. As the remote monitoring station 68 discovers each container, it associates each container with a node and assigns each container a node identifier.

Figure 11:
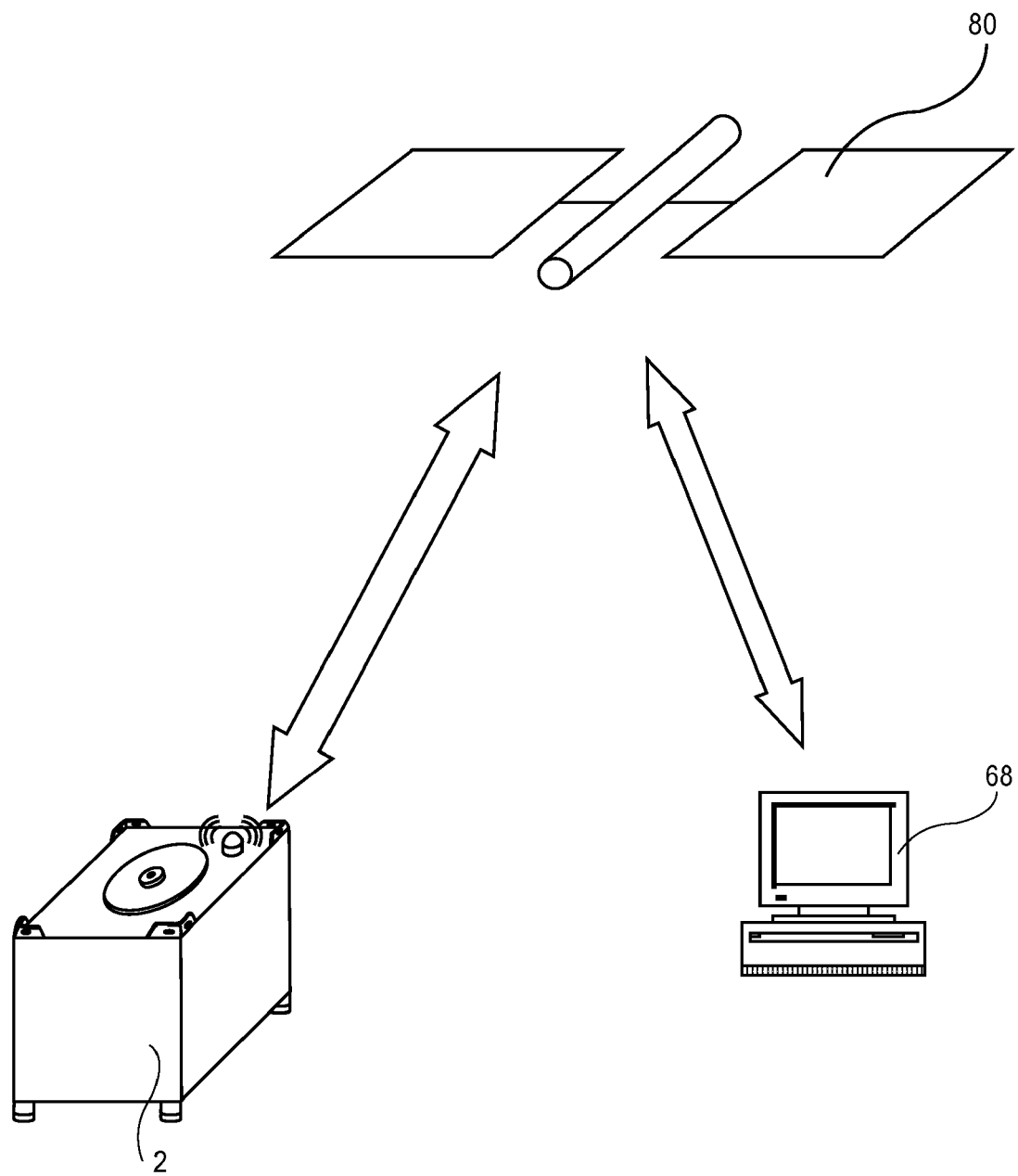
FIG. 11 is a block diagram of a fourth implementation of the system of the present invention, wherein the wireless communications medium includes satellite communications.
Figure 12:
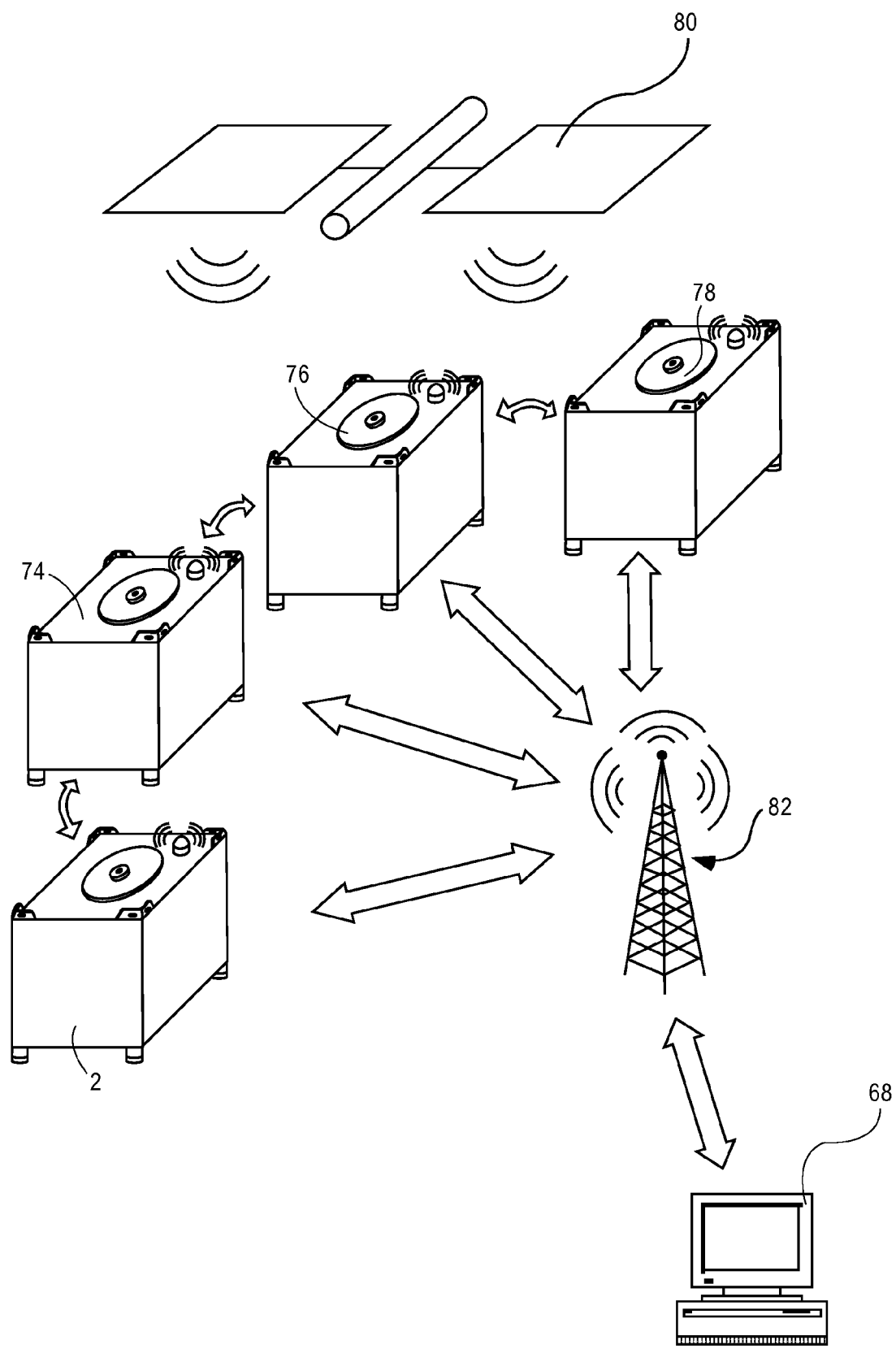
FIG. 12 is a block diagram of a fifth implementation of the system of the present invention, wherein the wireless communications medium includes satellite communications and communications via a cellular phone network.

FIGS. 11 and 12 illustrate exemplary forms of the communications system 70, including a communications satellite 80 and a cellular phone system 82.

As illustrated in FIG. 12, both the communications satellite 80 and the cellular phone system 82 may be used to communicate with the containers 2,74,76,78. This is in addition to the container-to-container and container-to-remote monitoring station RF communications. In this situation, each container is operable to select a preferred medium of communications for communicating with the remote monitoring station 68. For example, it may be preferred to communicate via the RF transceiver 52 over the GPRS transceiver 48 because the RF transceiver costs less, uses less power, etcetera. Similarly, it may be preferred to communicate via the GPRS transceiver 48 over the satellite communicates modem for the same reasons.

To select a preferred communications medium, the controller 44 executes a selection algorithm based on business rules of a particular implementation. The controller 44 may first attempt to communicate with the remote monitoring station 68 via the RF transceiver 52, either directly or via another device 14. If the controller 44 cannot establish communications with the remote monitoring station 68 via the RF transceiver 52, it attempts to establish communications with the remote monitoring station 68 via the cellular phone network using the GPRS transceiver 48. Finally, if communications with the remote monitoring station 68 are not available via the cellular phone network, the controller 44 may attempt to establish communications with the remote monitoring station 68 via the communications satellite 80 using the satellite communications modem.

Figure 13:
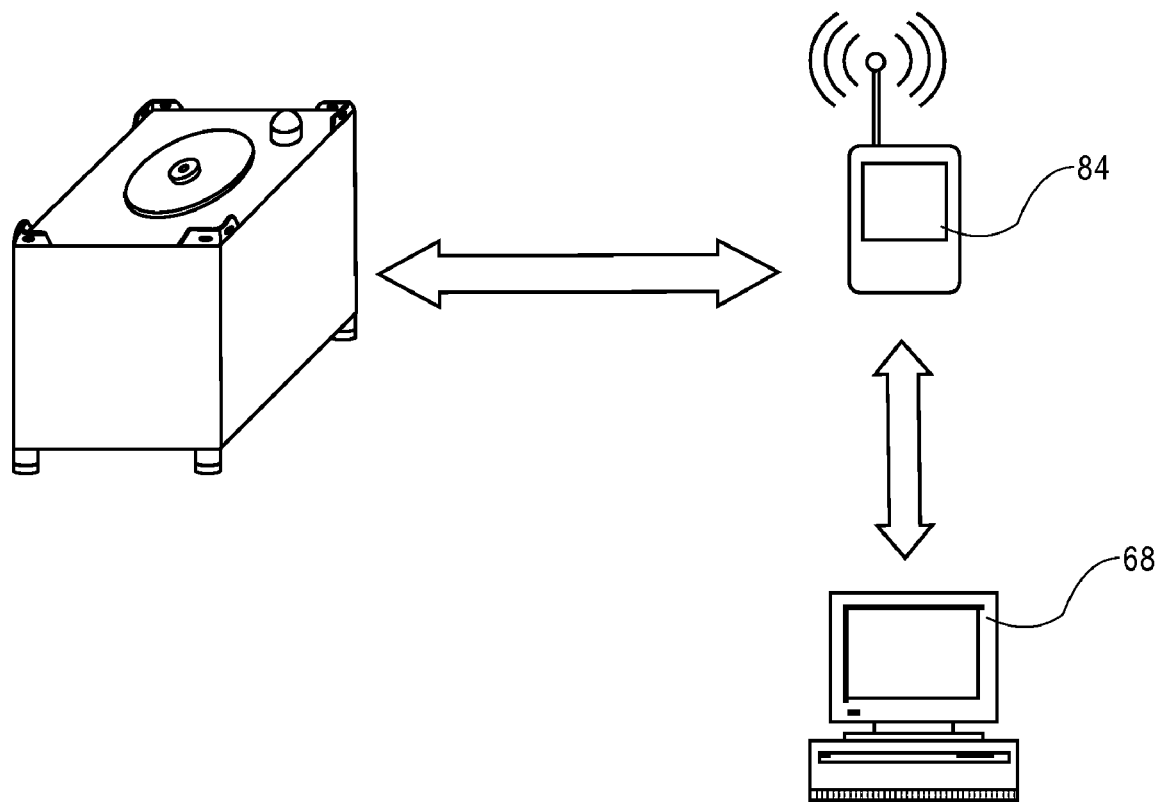
FIG. 13 is a block diagram of a sixth implementation of the system of the present invention, wherein a wireless hand-held device enables communications between the sensing and communications device and the remote monitoring station.

Another implementation of the system of the present invention is illustrated in FIG. 13, wherein a wireless handheld device 84 communicates with both the device 14 and the remote monitoring station 68. This implementation may be used, for example, where a user carries the wireless handheld device 84 in the vicinity of the container 2 such that the container 2 can communicate with the handheld device 84 via the RF transceiver 52. The user then may connect the device 84 to the remote monitoring station 68, via a wired or wireless connection, to download data received from the device 14 to the station 68.

Figure 14:
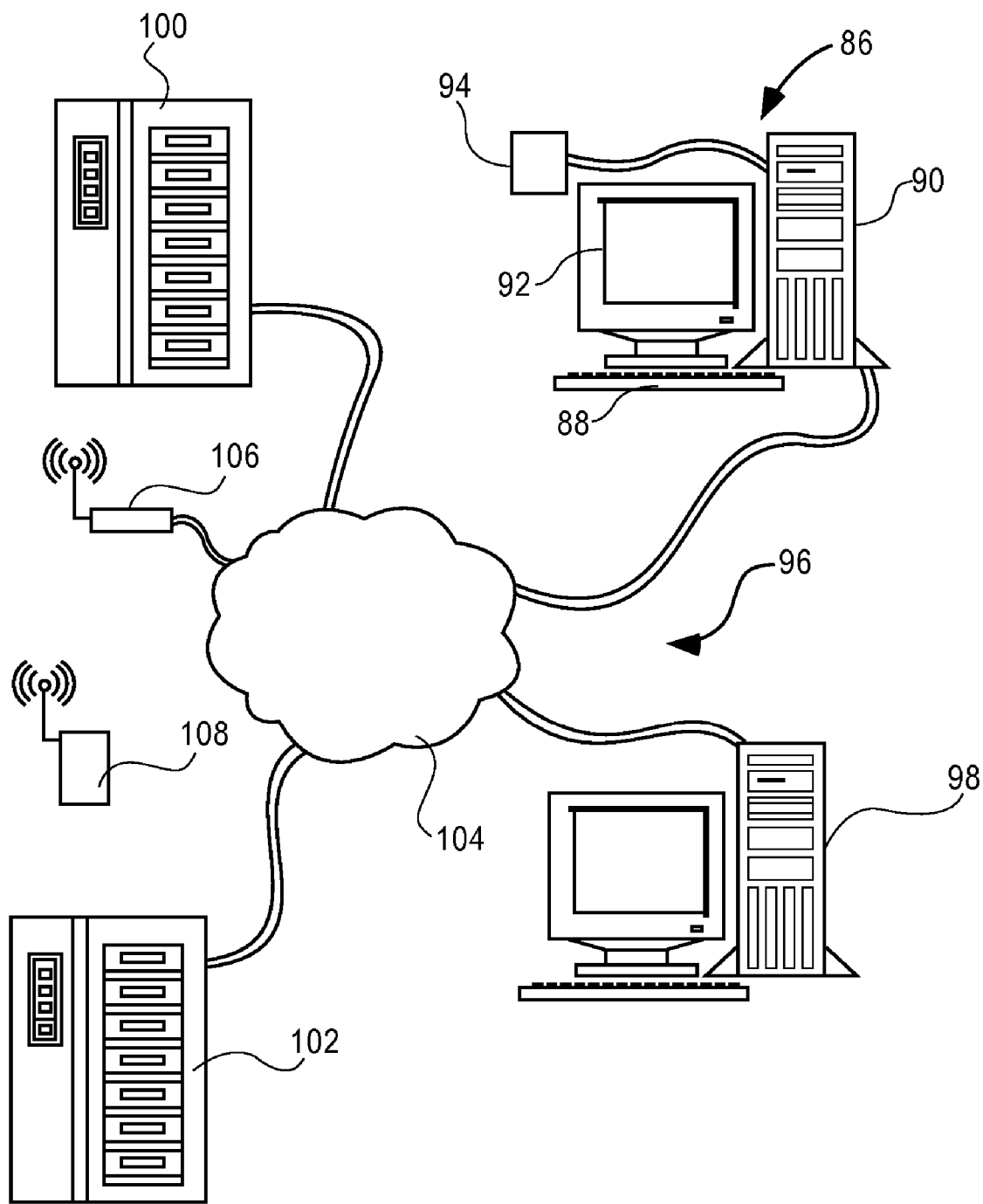
FIG. 14 is an exemplary computer network for implementing a computer program according to the principles of the present invention.

The present invention further comprises a method of receiving and analyzing data received from the device 14 and presenting the data to a user via the remote monitoring station 68. The method of the present invention is especially well-suited for implementation on a computer or computer network, such as the computer 86 illustrated in FIG. 14 that includes a keyboard 88, a processor console 90, a display 92, and one or more peripheral devices 94, such as a scanner or printer. The computer 86 may be a part of a computer network, such as the computer network 96 that includes one or more client computers 86,98 and one or more server computers 100,102 and interconnected via a communications system 104. The present invention may also be implemented, in whole or in part, on a wireless communications system including, for example, a network-based wireless transmitter 106 and one or more wireless receiving devices, such as a hand-held computing device 108 with wireless communication capabilities. The present invention will thus be generally described herein as including a computer program. It will be appreciated, however, that the principles of the method of the present invention are useful independently of a particular implementation, and that one or more of the steps described herein may be implemented without the assistance of a computing device.

The method of the present invention can be implemented in hardware, software, firmware, or a combination thereof. In a preferred embodiment, however, the method is implemented with a computer program. The computer program and equipment described herein are merely examples of a program and equipment that may be used to implement the present invention and may be replaced with other software and computer equipment without departing from the scope of the present invention.

The computer program of the present invention is stored in or on a computer-usable medium, such as a computer-readable medium, residing on or accessible by a host computer for instructing the host computer to implement the method of the present invention as described herein. The host computer may be a server computer, such as server computer 100, or a network client computer, such as computer 86. The computer program preferably comprises an ordered listing of executable instructions for implementing logical functions in the host computer and other computing devices coupled with the host computer. The computer program can be embodied in any computer-usable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by those skilled in the art that the program may comprise a single list of executable instructions or two or more separate lists, and may be stored on a single computer-usable medium or multiple distinct media. The program will also be described as comprising various "code segments," which may include one or more lists, or portions of lists, of executable instructions. Code segments may include overlapping lists of executable instructions, that is, a first code segment may include instruction lists A and B, and a second code segment may include instruction lists B and C.

A "computer-usable medium" can be any means that can contain, store, or communicate the program for use by or in connection with the instruction execution system, apparatus, or device. The computer-usable medium can be, for example, but is not limited to, an electronic, magnetic, optical, electromagnetic, or semi-conductor system, apparatus, or device. More specific, although not inclusive, examples of computer-usable media would include the following: a portable computer diskette, a random access memory (RAM), a read-only memory (ROM), an erasable, programmable, read-only memory (EPROM or Flash memory), and a portable compact disk read-onlymemory (CDROM). The computer-usable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The computer program is operable to receive and analyze the data generated by one or more devices 14 and present the data to a user. The program receives the data generated by the device 14 and stores the data in a database, wherein the database is stored locally on the remote monitoring station 68, on a device external to the station 68 and accessible via a network medium, or both.

The program determines whether a data value has exceeded a threshold, wherein the threshold may be predetermined or determined by a user. If a data value has exceeded a threshold, the program alerts a user. An exemplary user interface 110 for presenting container data and alerting a user of exceptional values is illustrated in FIG. 15. The interface 110 includes various columns of information, including columns pertaining to temperature, pressure, humidity, and shock. The information in the interface 110 relates to a single container (container 003), and is sorted according to time of data origin. The interface 110 alerts users to exceptional data values by highlighting cells, such as cells 112, 114, and 116, that contain the exceptional values. Thus, users can quickly and easily identify data values that exceed the thresholds.

The program may provide collective data concerning a plurality of containers, such as a graph of temperature values, an average temperature, a median temperature, an average fill level or a total amount of contents of all of the containers.

The program may notify users of exceptional data values in a variety of ways, including via e-mail, telephone, pager, fax, etcetera. The program enables users to determine threshold levels associated with each type of data received from the device 14, and to select a preferred notification method associated with each type of data. For example, the user may determine threshold levels associated with each of the temperature, pressure, and humidity measurements, wherein any measured value that exceeds the corresponding threshold is an exceptional value. Furthermore, the user may determine that a course deviation in excess of a certain distance, such as 50 miles or 100 miles, would constitute an exceptional location value. The user may then determine that exceptional temperature and humidity measurements are reported via e-mail, and that exceptional pressure and location measurements are reported by way of a cell phone message.

The program also enables the user to program the device 14. The user can communicate instructions to the device 14 via the remote monitoring station 68, for example, to select a type of data to monitor, a frequency of data generation, and a type of interface to use for communications.

Although the invention has been described with reference to an embodiment illustrated in the attached drawings, it is noted that equivalents may be employed and substitutions made herein without departing from the scope of the invention as recited in the claims. Those skilled in the art will appreciate, for example, that although the present invention has been illustrated and described with a container for storing and transporting liquids, the present invention has application to other items, including containers for storing and transporting dry goods as well as non-container items. Furthermore, the principles of the present invention may be From the preceding description, it can be appreciated that the present invention provides a computer program and method for analyzing data generated by a remote container monitoring apparatus and presenting the data to a user. It is noted that equivalents may be employed and substitutions made to the computer program without departing from the scope of the invention as recited in the claims.

Furthermore, the combination of computer code segments operable to implement the present invention may be distributed across a computer network. For example, programming and control of a plurality of devices 14 could occur using personal computers at multiple locations throughout the nation, and the data collected by the devices 14 could then be communicated to regional sites using a communications network such as the Internet. Computers at the regional sites could perform data analysis and send the results to one or more remote monitoring stations. Copies of the data may be stored in any or all of the computers involved in the distributed process.

Having thus described a preferred embodiment of the invention, what is claimed as new and desired to be protected by Letters Patent includes the following:

The invention claimed is:

1. A system for monitoring conditions of an object, the system comprising:
   a first sensor for sensing a first condition related to said object and generating first condition data;
   an identification component for storing object identification data;
   a first wireless interface for communicating according to a first wireless protocol;
   a second wireless interface for communicating according to a second wireless protocol; and a controller for determining based on business rules of a particular implementation a preferred interface for communicating with a remote monitoring station, wherein the first interface is preferred if communications with the remote monitoring station are available via the first interface, and wherein the second interface is preferred if communications via the first interface are not available, and for communicating the first condition data and the identification data to the remote monitoring station via the preferred wireless protocol.

2. The system as set forth in claim 1, wherein the first interface communicates via a radio frequency signal.

3. The system as set forth in claim 2, wherein the radio frequency signal is chosen from the group consisting of 433.92 MHz, 902 MHz to 928 MHz, and 2.46 GHz.

4. The system as set forth in claim 1, wherein the first wireless protocol is a radio frequency identification protocol.

5. The system as set forth in claim 1, wherein the first wireless interface communicates according to a cellular telephone system protocol.

6. The system as set forth in claim 5, wherein the cellular telephone system protocol is chosen from the group consisting of analog, digital, third generation, and general packet radio service.

7. The system as set forth in claim 1, wherein the object is a container comprising a container housing, wherein the first sensor, the identification component, the first interface, the second interface, and the controller are contained within a sealed cavity that is integral with the container housing.

8. The system as set forth in claim 7, wherein the sealed cavity is sealed by a removable cap, wherein the cap is metal and is an antenna for at least one of the first interface and the second interface.

9. The system as set forth in claim 7, wherein the sealed cavity is sealed by a removable cap, wherein the cap is made of a material that permits wireless communications to pass therethrough.

10. The system as set forth in claim 7, further comprising a second sensor for sensing a second condition, wherein the second sensor is associated with the container and is not contained within the sealed cavity, and wherein the controller receives the second condition data from the second sensor via a wireless communication means, and communicates the second condition data via the preferred wireless protocol.

11. The system as set forth in claim 7, wherein the container is an open-top liquid storage container.

12. The system as set forth in claim 7, wherein the container is a sealable liquid storage container with a capacity of from about one-hundred gallons to about six-hundred gallons.

13. The system as set forth in claim 12, wherein the container is a metal intermediate bulk container.

14. The system as set forth in claim 1, further comprising a location determining component for generating location data, wherein the controller communicates the location data via the preferred wireless protocol.

15. The system as set forth in claim 1, wherein the first sensor is a fill sensor for generating data indicating an amount of contents of the container.

16. The system as set forth in claim 1, further comprising a satellite communications modem for enabling the controller to communicate via a satellite communications protocol.

17. A method of remotely monitoring conditions of a container and presenting the conditions to a user, the method comprising:
sensing a first condition associated with the container and generating first condition data;
associating identification data with the container;
utilizing a controller associated with the container that selects a preferred communications protocol from a first wireless protocol and a second wireless protocol, determined based on a business of a particular implementation wherein the first protocol is selected if communications via the first protocol are available and the second protocol is selected if communications via the first protocol are not available; and
communicating the first condition data and the identification data to a remote monitoring station via the preferred wireless protocol.

18. The method as set forth in claim 17, wherein the first wireless protocol is a radio frequency identification protocol.

19. The method as set forth in claim 18, wherein the first wireless protocol communicates via a radio frequency signal chosen from the group consisting of 433.92 MHz, 902 MHz to 928 MHz, and 2.4 GHz.

20. The method as set forth in claim 17, wherein the first wireless protocol is a cellular telephone communications protocol.

21. The method as set forth in claim 20, wherein the cellular telephone system protocol is chosen from the group consisting of analog, digital, third generation, and general packet radio service.

22. The method as set forth in claim 17, wherein the first wireless protocol is for direct communications with devices associated with other containers.

23. The method as set forth in claim 17, further comprising receiving identification data from an identification component and communicating the identification data via the preferred wireless protocol.

24. The method as set forth in claim 17, further comprising receiving location data from a location determining component and communicating the location data via the preferred wireless protocol.

25. The method as set forth in claim 17, further comprising:
establishing a network of containers by identifying a plurality of containers and associating each container with a network node; and
receiving condition data and identification data from each network node, wherein a first network node communicates condition data and identification data received from a second network node to the remote monitoring station.

26. A system for monitoring conditions of a container, the system comprising:
a container housing;
a first sensor for sensing a first condition and generating first condition data;
a second sensor for sensing a second condition and generating second condition data;
a global positioning system receiver for generating location data;
an identification component for storing identification data;
a first wireless interface for communicating via a cellular telephone system protocol;
a second wireless interface for communicating with an interface associated with another container and for communicating indirectly with a remote monitoring station; and
a controller for determining, based on business rules of a particular implementation a preferred interface for communicating with the remote monitoring station, wherein the first interface is preferred if communications with the remote monitoring station are available via the first interface, and wherein the second interface is preferred if communications with the remote monitoring station are not available via the first interface, and for communicating the first condition data, the second condition data, the identification data, and the location data to the remote monitoring station via the preferred wireless medium, wherein the first sensor, the global positioning system receiver, the identification component, the first wireless interface, the second wireless interface, and the controller are contained within a sealable cavity that is integral with the container housing.

27. The system as set forth in claim 26, wherein the second wireless interface communicates according to a radio frequency identification protocol.

28. The system as set forth in claim 27, wherein the second wireless interface communicates via a radio frequency signal chosen from the group consisting of 433.92 MHz, 902 MHz, to 928 MHz, and 2.4 GHz.

29. The system as set forth in claim 26, wherein the cellular telephone system protocol is chosen from the group consisting of analog, digital, third generation, and general packet radio service.

30. The system as set forth in claim 26, wherein the container is a sealable liquid storage container with a capacity of from about one-hundred gallons to about six-hundred gallons.

31. the system as set forth in claim 30, wherein the container is a stackable intermediate bulk container.

32. The system as set forth in claim 26, wherein the cavity is sealed by a metal cap that is an antenna for at least one of the first and second interfaces.

33. The system as set forth in claim 26, further comprising a communications modem for receiving data from the controller and communicating the data via a second wireless protocol.

34. The system as set forth in claim 33, wherein the communications modem is a satellite modem and communicates with the controller via a wireless medium.

35. The system as set forth in claim 26, wherein the cavity is sealed by a removable cap, wherein the cap is made of a material that permits wireless communications to pass therethrough.

36. The method as set forth in claim 25, wherein said step of establishing a network of containers is carried out under the control of the remote monitoring station.

37. The method as set forth in claim 25, wherein said step of establishing a network of containers is carried out under the control of one or more controllers in the containers.

* * * * *